Oct. 10, 1944. E. J. COURTNEY 2,360,202

PRESSURE GAUGE

Filed March 31, 1944

INVENTOR
Edward J. Courtney
BY
Symes, Wall & Lechner
ATTORNEYS

Patented Oct. 10, 1944

2,360,202

UNITED STATES PATENT OFFICE 2,360,202

PRESSURE GAUGE

Edward J. Courtney, Oaklyn, N. J.

Application March 31, 1944, Serial No. 528,842

3 Claims. (Cl. 73—411)

This invention relates to pressure gauges.

The invention has to do with that type of gauge employing a spring tube or Bourdon tube for actuating the mechanism operating the pointer, and its nature, objects and advantages will be best understood from the following.

In pressure gauges of this type, the gauge has a stem provided with a socket to receive the open end of the spring or Bourdon tube. In assembling, the open end of the tube is introduced into the socket, and then the tube is brazed or soldered in place. After this the hole or the last portion of the hole in the stem (for conducting the pressure medium into the tube) is drilled, the drill also serving to form a hole in the Bourdon tube. It is a very common occurrence that the molten spelter enters the open end of the tube, filling the tube for some distance beyond the point where the hole is drilled in the tube. When this is the case, the pressure medium cannot flow into the tube and the gauge is inoperative. From this cause a relatively large number of gauges are rejected and must be done over.

The primary object of my invention is to overcome this difficulty.

How the foregoing is accomplished is illustrated in the accompanying drawing, wherein—

Figure 1:
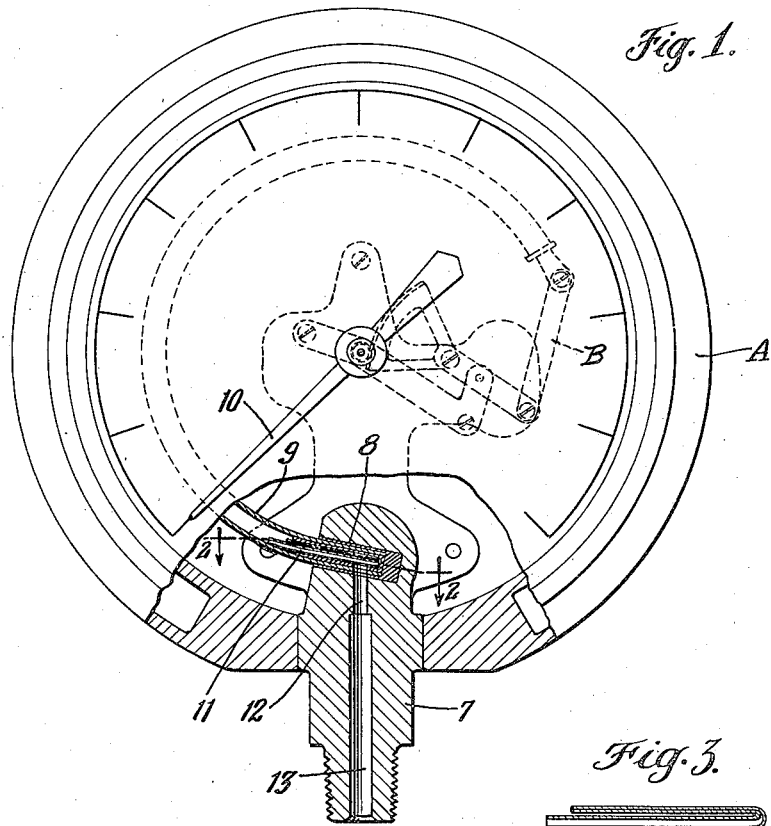
Figure 1 is a face elevation of a pressure gauge, partially in section, illustrating my improvements and the manner in which assembly is effected.

Referring now to Figure 1.

The reference character A indicates the gauge as a whole. This gauge has a stem 7 provided with a socket 8 in a lateral face thereof. The reference numeral 9 indicates the spring or Bourdon tube, the open end of which is adapted to be inserted into the socket 8 and the closed end of which is fastened to the operating mechanism indicated as a whole by the reference character B, which actuates the dial pointer or hand 10.

Figure 3:
Figure 3 is a cross-sectional view of an auxiliary employed in carrying out my invention.
Figure 4:
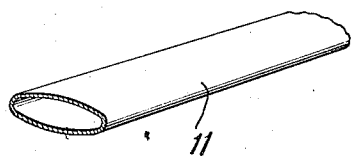
Figure 4 is a perspective view illustrating a form of tubing which may be employed in carrying out the invention.
Figure 2:
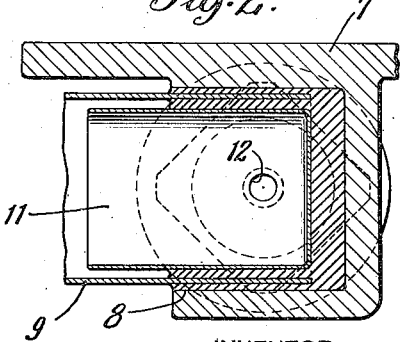
Figure 2 is an enlarged view taken on the line 2—2 of Figure 1.

Before the Bourdon tube is inserted into the socket 8, a tube 11 is thrust into the open end of the Bourdon tube. The tube 11 is made by taking a length of flat tubing as shown in Figure 4, and bending it back on itself, as indicated in Figure 3. It is usually preferable, although not necessary, to squeeze that portion of the length of the tubing which is to be folded over so that that portion of the tubing is collapsed, also as indicated in Figure 3. The tubing is preferably made of light gage copper or of some similar metal which is sufficiently ductile to readily lend itself to folding. The length of the tubing, in folded condition, is such that the open end extends a substantial distance into the Bourdon tube.

The open end of the Bourdon tube with the tubing 11 in place, is now introduced into the socket 8 and the Bourdon tube is brazed or soldered into place. It will be seen that while the molten spelter is free to enter into the open end of the Bourdon tube and to surround the tubing 11, it cannot enter into the interior of the tubing 11, save only through the grossest kind of negligence.

Thus, when the last portion 12 of the hole 13 is drilled through the stem and through the wall of the Bourdon tube and through the wall of the tubing 11, there will be a clear passage through the stem into the interior of the tubing and into the interior of the Bourdon tube.

By this means, I overcome the difficulties hereinbefore mentioned and have been able to assemble thousands upon thousands of gauges without any rejections.

The tubing 11 is either made of such size as to fit somewhat snugly in the Bourdon tube or the folded over portion is not bent completely parallel so that the two legs diverge somewhat, in which case the spring of the metal will be sufficient to hold the tubing in place during insertion and welding of the Bourdon tube.

I claim:

1. In a pressure gauge, a Bourdon tube, a bored stem having a socket into which the open end of said Bourdon tube extends, a length of tubing folded over on itself and located in the open end of the Bourdon tube with the bent portion of the folded over tubing adjacent to the open end of the Bourdon tube, said Bourdon tube being soldered in the socket, the wall of the Bourdon tube and the wall of the folded over tubing having aligned holes in communication with the bore of the stem, and the open end or ends of the folded over tubing extending into the Bourdon tube well beyond said holes.

2. In a pressure gauge, a Bourdon tube, a stem having a socket into which the open end of said Bourdon tube extends, a tubular member having an open end extending into the open end of the Bourdon tube and positioned with a wall portion thereof adjacent the open end of the Bourdon tube and substantially closing the open end of the Bourdon tube, said tubular member being soldered in the open end of the Bourdon tube and the open end of the Bourdon tube being soldered in the socket, the wall of the Bourdon tube, the wall of the tubular member, and the stem having intercommunicating apertures, and the open end of the tubular member being located in the Bourdon tube well beyond the aperture in the wall thereof.

3. In a pressure gauge, a Bourdon tube, a stem having a socket into which the open end of said Bourdon tube extends, a closure member for the open end of the Bourdon tube, said closure member having a tubular portion extending into the Bourdon tube and having an opening comunicating with the interior of the Bourdon tube, said closure member being soldered in the open end of the Bourdon tube and the open end of the Bourdon tube being soldered in the socket, the wall of the Bourdon tube, the wall of said tubular portion of the closure member, and the stem having intercommunicating apertures, and said opening of the tubular portion of the closure member being located in the Bourdon tube well beyond the aperture in the wall thereof which provides communicaton with the aperture in the stem.

EDWARD J. COURTNEY.